United States Patent [19]

Kitamura

[11] Patent Number: 4,470,426
[45] Date of Patent: Sep. 11, 1984

[54] VACUUM CONTROL VALVE

[75] Inventor: Kazuhiko Kitamura, Nagoya, Japan

[73] Assignee: Aisin Seiki Kabushiki Kaisha, Kariya, Japan

[21] Appl. No.: 298,506

[22] Filed: Sep. 1, 1981

[30] Foreign Application Priority Data

Sep. 1, 1980 [JP] Japan .................... 55-120920

[51] Int. Cl.³ .............................. F15B 5/00
[52] U.S. Cl. ..................... 137/85; 137/596; 137/627.5
[58] Field of Search ............. 137/85, 596, 627.5

[56] References Cited

U.S. PATENT DOCUMENTS

| 4,134,418 | 1/1979 | Woodcock | 137/627.5 |
| 4,166,476 | 9/1979 | Yamanaka et al. | 137/627.5 |
| 4,254,938 | 3/1981 | Inada et al. | 137/627.5 |
| 4,293,118 | 10/1981 | Olson et al. | 137/627.5 |
| 4,315,521 | 2/1982 | Anderson et al. | 137/85 |
| 4,316,479 | 2/1982 | Franz et al. | 137/85 |
| 4,347,699 | 9/1982 | Kitamura | 137/85 |
| 4,366,670 | 1/1983 | Kitamura | 137/85 |

Primary Examiner—Alan Cohan
Assistant Examiner—John A. Rivell
Attorney, Agent, or Firm—Oblon, Fisher, Spivak, McClelland & Maier

[57] ABSTRACT

A vacuum control valve includes a body having a vacuum inlet port, a vacuum outlet port and an atmospheric inlet port formed therein, a movable diaphragm type mechanism positioned within the body to define a vacuum chamber and an atmospheric chamber within the body wherein the vacuum chamber is in communication with the vacuum outlet port and the atmospheric chamber is in communication with the atmospheric inlet port and wherein the movable mechanism is movable in response to change in vacuum pressure within the vacuum chamber, a spring mechanism normally biasing the movable mechanism in a first position, a valve mechanism movable in association with the movable mechanism to thereby control fluid communication between the vacuum inlet port and the vacuum chamber, and between the atmospheric inlet port and the vacuum chamber and a regulating mechanism which further includes a cam mechanism rotatably mounted within the body and operatively associated with the spring mechanism wherein the cam mechanism is rotated in response to loads applied to the vacuum control valve to thereby adjust the biasing force of the spring mechanism.

1 Claim, 3 Drawing Figures

VACUUM CONTROL VALVE

BACKGROUND OF THE INVENTION

1. Field of the Invention

This invention relates to a vacuum control valve and more particularly to a vacuum control valve having a regulating mechanism which desirably regulates controlled vacuum pressure.

2. Description of the Prior Art

A vacuum control valve has been proposed which includes a diaphragm valve movable in response to inlet vacuum pressure to thereby control fluid communication between inlet and outlet ports. In such vacuum control valve, it is desirable that inlet vacuum pressure be regulated in response to loads or the like applied to the vacuum control valve. However, prior art control valves have no regulating mechanism provided therefor.

SUMMARY OF THE INVENTION

An object of the present invention is to provide an improved vacuum control valve which includes a regulating mechanism to thereby regulate inlet vacuum pressure in response to loads or the like applied to the vacuum control valve.

In accordance with the present invention, a vacuum control valve is provided which includes a body having a vacuum inlet port, a vacuum outlet port and an atmospheric inlet port formed therein, a movable diaphragm type mechanism positioned within the body to define a vacuum chamber and an atmospheric chamber within the body wherein the vacuum chamber is in communication with the vacuum outlet port and the atmospheric chamber is in communication with the atmospheric inlet port and wherein the movable mechanism is movable in response to change in vacuum pressure within the vacuum chamber, a spring mechanism normally biasing the movable mechanism in a first position, a valve mechanism movable in association with the movable mechanism to thereby control fluid communication between the vacuum inlet port and the vacuum chamber, and between the atmospheric inlet port and the vacuum chamber and a regulating mechanism which further includes a cam mechanism rotatably mounted within the body and operatively associated with the spring mechanism wherein the cam mechanism is rotated in response to loads applied to the vacuum control valve to thereby adjust the biasing force of the spring mechanism.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
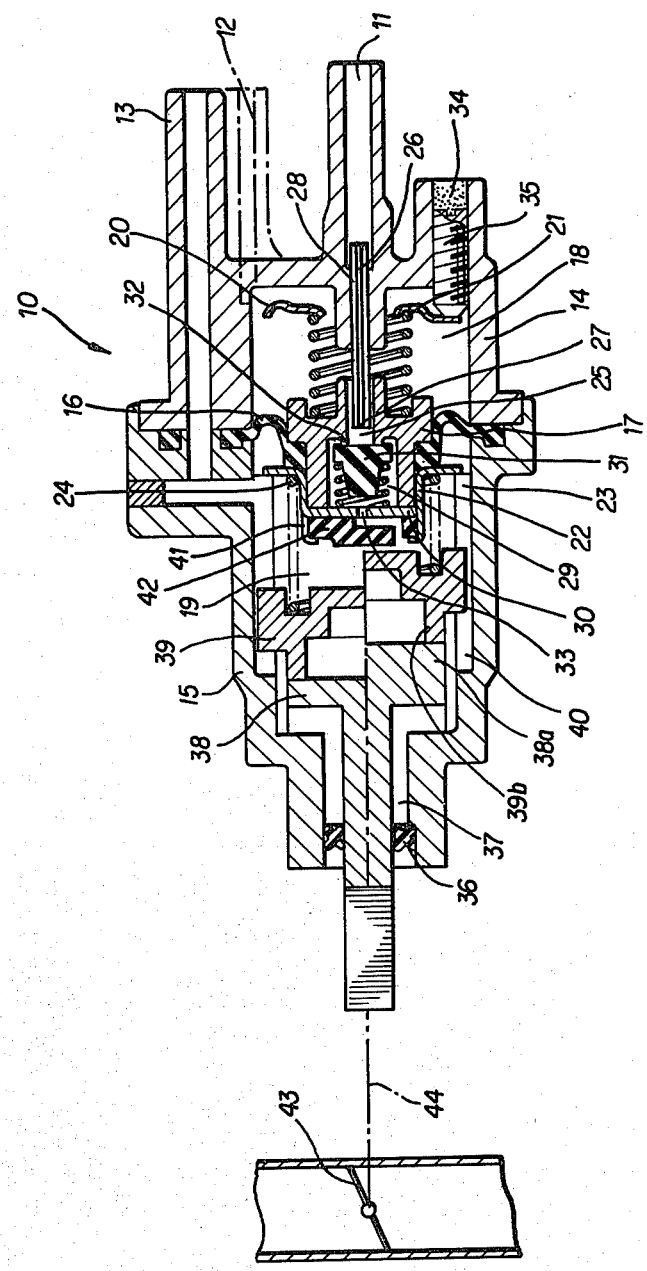
FIG. 1 is a cross sectional view of a vacuum control valve according to the present invention, wherein an upper side of a regulating mechanism illustrates a first operating position and a lower side thereof illustrates a second operating position.

In FIG. 1, a vacuum control valve 10 includes first and second bodies 14, 15 secured to each other, first body 14 having a vacuum inlet port 11 in communication with a vacuum source such as intake manifold of a vehicle engine, a vacuum outlet port 12 in communication with a vacuum operated device, and an atmospheric inlet port 13 to receive atmospheric pressure via an air filter.

A diaphragm 16 has an outer periphery securely inserted between both bodies 14, 15 and an inner periphery on which a movable member 17 is secured to thereby constitute a movable member of a diaphragm type. The movable member defines within first and second bodies a vacuum chamber 18 which is adapted to be in communication with ports 11, 12 and an atmospheric pressure chamber 19 which is in communication with port 13.

Movable member 17 is positioned within vacuum chamber 18 and is maintained in its illustrated original position by a first spring 21 one end of which is seated against a retainer 20. At this time, a retainer 22 which is positioned within atmospheric chamber 19 is brought into contact with an annular shoulder 23 of body 15. A second spring 24 one end of which is seated against retainer 22 biases movable member 17 towards the right. However, it is predetermined that the biasing force of second spring 24 is less than that of first spring 21 and, therefore, movable member 17 is normally maintained in its illustrated position.

Movable member 17 has a central hole 25 and a stationary member 28 extends part of the length of central hole 25. Stationary member 28 is secured to body 14 and moreover, has a central passage 26 formed therein between inlet port 11 and vacuum chamber 18. The left end of member 28 acts as a valve seat 27, as will be clear from the following discussion.

A valve member 31 is positioned within left concave portion 29 of movable member 17 and is biased via spring 30 in its normal illustrated position wherein valve member 31 is brought into contact with a valve seat 32 provided on movable member 17. Under these conditions, concave portion 29 which is in communication with atmospheric chamber 19 by way of an orifice 33 formed in retainer 22 is fluidically separated from vacuum chamber 18. Valve member 31 is normally spaced from valve seat 27, and inlet port 11 is led to vacuum chamber 18 via passage 26 and central hole 25. One end of spring 30 is seated against retainer 22.

When vacuum pressure within vacuum chamber 18 increases, movable member 17 is urged toward the right. When movable member 17 moves a predetermined distance, valve member 31 is brought into contact with valve seat 27 to thereby interrupt fluid communication between inlet port 11 and vacuum chamber 18. By further movement of movable member 17, valve seat 32 is spaced from valve member 31 since valve member 31 is prevented from further movement. Thus, atmospheric pressure will be introduced into atmospheric chamber 18 via orifice 33, concave portion 29, and central hole 25. Vacuum pressure within vacuum chamber 18 will now decrease and movable member 17 is urged toward the left by spring 21. Therefore, valve seat 32 is brought into contact with valve member 31 to thereby re-interrupt fluid communication between atmospheric chamber 19 and vacuum chamber 18. By further movement of movable member 17 to the left. Valve member 31 is spaced from valve seat 27 to thereby allow fluid communication between inlet port 11 and vacuum chamber 18. Thereafter, the above-noted operation will be repeated and thus vacuum pressure will be regulated at the predetermined pressure. This regulated pressure will be transmitted through outlet port 12 to the vacuum operated device.

The valve of the above regulated pressure is set by the biasing forces of both springs 21, 24. The biasing force of first spring 21 may be adjusted by the position of retainer which is adjusted by screw 35 which is, in turn, threaded through body 14 by way of seal 34. While the biasing force of second spring 24 is adjusted by a regulating mechanism including a retainer 39 and a cam member 38, the position of retainer 39 is adjusted by rotatable cam member 38 which has a rotational shaft portion rotatably mounted in body 15 via seal 36 and bearing 37, and thus the biasing force of second spring 24 may be adjusted.

Figure 2:
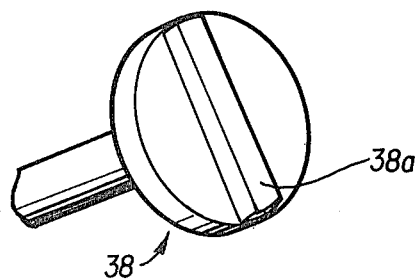
FIG. 2 is a partially cut away view of a cam mechanism of the regulating mechanism in FIG. 1.
Figure 3:
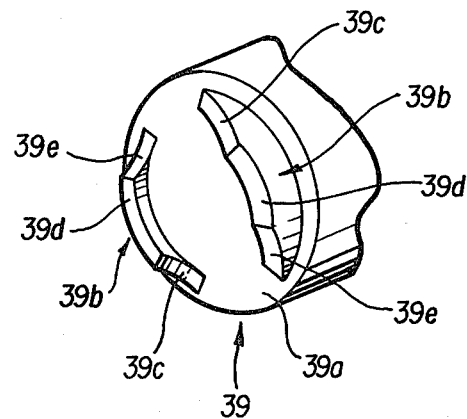
FIG. 3 is a partially cut away view of a retainer of the regulating mechanism in FIG. 1.

As shown in FIGS. 2 and 3, cam member 38 has a cam surface 38a and retainer 39 has corresponding surfaces 39a to 39e. When cam surface 38a is in contact with the bottom surface 39a of retainer 39, cam member 38 and retainer 39 are positioned as shown in upper portion of FIG. 1. From the above-noted operating conditions, when cam member 38 is rotated in one direction, for example, toward the right, cam surface 38a runs on first cam surfaces 39c, 39c of corresponding cam portions 39b, 39b of retainer 39. In response to further rotation of cam member 38 in the same direction, cam surface 38a runs in order on second cam surfaces 39d, 39d and third cam surfaces 39e, 39e. Therefore, the position of retainer 39 may be adjusted as shown in the lower portion of FIG. 1 in response to contact conditions between cam surface 38a and cam portions 39b, 39b. It will be apparent that the biasing force of second spring 24 will become relatively large in response to rightward movement of retainer 39 in FIG. 1.

In FIG. 3, first cam surfaces 39c and 39c, second cam surfaces 39d and 39d, and third cam surfaces 39e and 39e will be formed with the same configuration, respectively, and retainer 39 will be moved to its extreme rightward position in FIG. 1 when cam surface 38a runs on second cam surfaces 39d, 39d. It will be apparent that the biasing force of spring 24 may be properly adjusted by means of modifications of the cam configuration.

If cam surfaces of retainer 39 are formed so as to be continuously inclined, adjustment of the biasing force of the spring may be possible proportional to rotation of cam member 38. Cam member 38 is mechanically connected to, for example, a throttle valve 43 of the vehicle by member 44 and, therefore, is rotated in response to a change in degree of opening of throttle valve 43.

As will be apparent hereinbefore, the biasing force of first spring 21 may be set by threaded movement of screw 35 and thus regulating pressure via valve operation as mentioned above will be regulated to a predetermined value. This predetermined regulating pressure may be further desirably adjusted by means of adjustment of the biasing force of spring 24 mentioned above in response to loads such as a change in the degree of opening of throttle valve 43. Accordingly, the value of the outlet pressure which leads to outlet port 12 may depend on the balance of the biasing forces of both springs 21, 24.

Part of the outer periphery of retainer 39 is formed so as to be of relatively large diameter which may be positioned within groove 40 provided in body 15 so that retainer 39 is prevented from rotating. A damper 42 which is held by a cut standing portion 41 of a portion of retainer 22 prevents fluid pulsations caused by repeated valve operations.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vacuum control valve for an engine comprising:
a body having a vacuum inlet port, a vacuum outlet port and an atmospheric inlet port formed therein;
movable diaphragm type means positioned within said body to define a vacuum chamber and an atmospheric chamber within said body, wherein said vacuum chamber is in communication with said vacuum outlet port and said atmospheric chamber is in communication with said atmospheric inlet port, and wherein said movable means is movable in response to change in vacuum pressure within said vacuum chamber;
spring means normally biasing said movable means in a first position;
valve means movable in association with said movable means to thereby control fluid communication between said vacuum inlet port and said vacuum chamber, and between said atmospheric inlet port and said vacuum chamber;
regulating cam means mounted within said body and operatively associated with said spring means, said cam means being rotated in response to loads applied to said vacuum control valve to thereby adjust the biasing force of said spring means, wherein said regulating cam means further comprises a retainer positioned within said body such that the position of said retainer is adjustable by said cam means so as to adjust the biasing force of said spring means; said cam means including a surface extending therefrom and a rotational shaft portion formed integral therewith such that said rotational shaft portion is rotatable in response to engine load and rotation of said shaft portion is directly transmitted to said retainer; and said retainer further comprises a plurality of surface members for selective engagement with said cam surface, said plurality of surface members including a first, second and third pair of cam surfaces in opposed radial positions on said retainer;
bearing means positioned in said body and upon which said rotational shaft portion of said cam means is rotatably mounted; and
seal means positioned within said body and within which said rotational shaft portion of said cam means is mounted.

* * * * *